United States Patent [19]

Kato

[11] Patent Number: 5,291,966
[45] Date of Patent: Mar. 8, 1994

[54] AUTOMOBILE POWER PLANT APPARATUS

[75] Inventor: Yoshikazu Kato, Kasugai, Japan

[73] Assignee: Tokai Rubber Industries, Ltd., Komaki, Japan

[21] Appl. No.: 832,380

[22] Filed: Feb. 7, 1992

[30] Foreign Application Priority Data

Feb. 15, 1991 [JP] Japan .................................. 3-21835

[51] Int. Cl.⁵ .................................................. B60K 5/00
[52] U.S. Cl. .................................. 180/292; 180/377
[58] Field of Search ............................... 180/292, 377

[56] References Cited

U.S. PATENT DOCUMENTS

| | | | |
|---|---|---|---|
| 3,825,090 | 7/1974 | Rinkle et al. | 180/292 |
| 4,889,207 | 12/1989 | Von Broock | 180/292 X |
| 5,090,502 | 2/1992 | Inoue et al. | 180/292 X |

*Primary Examiner*—Joseph D. Pape
*Attorney, Agent, or Firm*—Jacobson, Price, Holman & Stern

[57] ABSTRACT

An automobile power plant apparatus includes an engine, a transmission connected to the engine, a propeller shaft connected to the transmission, a front mount elastically supporting the engine, and a body provided with the engine, the transmission, the propeller shaft and the front mount. The transmission includes a mount engagement portion which is positioned substantially adjacent to a virtual center of the transmission in a vehicle lengthwise direction and which is positioned on a side of the transmission in a vehicle widthwise direction. The body includes a mount installation portion which is positioned substantially adjacent to the virtual center of the transmission in the vehicle lengthwise direction and which is positioned opposite to a side of the transmission in the vehicle widthwise direction, and the body further includes a rear mount which is installed to the mount installation portion and which engages with the mount engagement portion of the transmission. Thus, the transmission is elastically supported by the rear mount at its virtual center in its side which substantially corresponds to one of the vibrational nodes of the flexural vibrations in the automobile power plant apparatus. Hence, the automobile power plant does not generate disturbing noises which are oppressive to the ears of passengers.

8 Claims, 5 Drawing Sheets

AUTOMOBILE POWER PLANT APPARATUS

BACKGROUND OF THE INVENTION

1. Field of the Invention

The present invention relates to an automobile power plant apparatus. The automobile power plant apparatus is the part of an automobile which transmits the engine driving forces to the wheels.

2. Description of the Prior Art

As illustrated in the upper half of FIG. 7, an automobile power plant includes an engine 1, a transmission 2 connected to an output side of the engine 1 in series in a vehicle lengthwise direction "Y," a propeller shaft 3 connected to an output shaft of the transmission 2 at an end thereof in the vehicle lengthwise direction "Y," a front mount 4 elastically supporting the engine 1, a rear mount 5 elastically supporting a lower part of the transmission 2 at around an end 2a of the transmission 2, and a body 6. The body 6 is provided with the engine 1, the transmission 2, the propeller shaft 3, the front mount 4 and the rear mount 5. Further, the propeller shaft 3 is provided with universal joints 3a and 3b at its ends, respectively.

In the conventional automobile power plant apparatus, the rear mount 5 supports at around the end 2a of the transmission 2. This is mainly because the transmission 2 has a relatively small dimension "H" in a vertical direction at around the end 2a, and it accordingly is easy to provide a space for installing the rear mount 5.

In the conventional automobile power plant apparatus, when the engine 1 is running at a high speed, flexural vibrations enlarge, there arise phenomena like vibrations of the body 6 and noises, and consequently such phenomena escalates. The flexural vibrations consist of vertical components and horizontal components, and it is especially important to suppress the vertical components of the flexural vibrations in order to relieve the phenomena such as the vibrations of the body 6 and the noises.

In the lower half of FIG. 7, there is illustrated a basic characteristic of resonant mode accompanied by the flexural vibrations when the engine 1 is running at a high speed. As can be seen from the lower half of FIG. 7, since the engine 1 and the transmission 2 have a high rigidity, the boundary area between the engine 1 and the transmission 2 comes to have a low rigidity. Accordingly, it is likely to vibrate at the boundary area between the engine 1 and the transmission 2, and the boundary area corresponds to a vibrational loop "P1." Since the universal joints 3a and 3b have a low rigidity, they correspond to vibrational loops "P2" and "P3" respectively. Since the front mount 1 is placed near a position which corresponds to a vibrational node "P4," vibrations are hardly input into the front mount 1.

In the conventional automobile power plant apparatus, since there arise large amplitudes at around the end 2a of the transmission 2 and since the end 2a of the transmission 2 is elastically supported by the rear mount 5, as illustrated in the resonant mode the lower half of FIG. 7, the vibrations are transmitted increasingly to the body 6. As a result, such a construction is likely to cause disturbing noises which sound like oppressing to the ears of the passengers.

SUMMARY OF THE INVENTION

The problems described above may be solved by advancing the installation position of the rear mount 5 to a position which corresponds to a vibrational node "P5" shown in the lower half of FIG. 7. If such is the case, however, when it is attempted to provide a minimum road clearance in an appropriate amount for the body 6, a floor position of the body 6 should be raised by the amount. Thus, it is disadvantageous for providing an appropriate volume for a vehicle room inner space.

The present invention has been developed in view of the circumstances described above. It is therefore an object of the present invention to provide an automobile power plant apparatus which can suppress the disturbing feeling resulting from the resonance of the flexural vibrations during the high speed running of the engine, and the automobile power plant apparatus which is advantageous for providing an appropriate volume for a vehicle room inner space.

An automobile power plant apparatus according to the present invention achieves the above object, and it comprises:

an engine;

a transmission connected to an output side of the engine in series in a vehicle lengthwise direction;

a propeller shaft connected to an output shaft of the transmission at an end thereof in the vehicle lengthwise direction;

a front mount elastically supporting the engine;

a rear mount elastically supporting the transmission;

a body provided with the engine, the transmission, the propeller shaft, the front mount and the rear mount;

wherein the transmission includes a mount engagement portion which is positioned substantially adjacent to a virtual center of the transmission in the vehicle lengthwise direction and which is positioned on a side of the transmission in a vehicle widthwise direction;

. the body includes a mount installation portion which is positioned substantially adjacent to the virtual center of the transmission in the vehicle lengthwise direction and which is positioned opposite to a side of the transmission in the vehicle widthwise direction, and a rear mount which is installed to the mount installation portion;

the rear mount is held between the mount engagement portion and the mount installation portion; and the transmission is elastically supported by the body at a position thereof adjacent to the virtual center thereof in the side thereof in the vehicle lengthwise direction.

In the automobile power plant apparatus according to the present invention, the rear mount is positioned substantially adjacent to the virtual center of the transmission in the vehicle lengthwise direction. Namely, the rear mount is positioned substantially adjacent to a position which corresponds to the vibrational node "P5" illustrated in the lower half of FIG. 7. Hence, even when there arises the resonance of the flexural vibrations, there occur vibrations with less amplitudes at the rear mount in the automobile power plant apparatus according to the present invention.

In accordance with the present automobile power plant apparatus, the rear mount can be positioned substantially adjacent to a position which substantially corresponds to the vibrational node (i.e., the vibrational node "P5" illustrated in the lower half of FIG. 7) of the vertical components of the flexural vibrations. As a result, even when there arises the resonance of the flexural vibrations, there occur vibrations with less amplitudes at the rear mount in the present automobile power plant apparatus. Accordingly, the vibrations are inhibited from transmitting to the body by way of the rear mount. Hence, the automobile power plant apparatus according to the present invention can solve the problems of the disturbing noises which sound like oppressing to the ears of the passengers.

In addition, since the side, not the lower part, of the transmission is elastically supported by the rear mount in the present automobile power plant apparatus according to the present invention, it is possible to suppress the raising of the floor position of the body, and it is also possible to provide an appropriate volume for a vehicle room inner space while securing a minimum road clearance for a floor.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
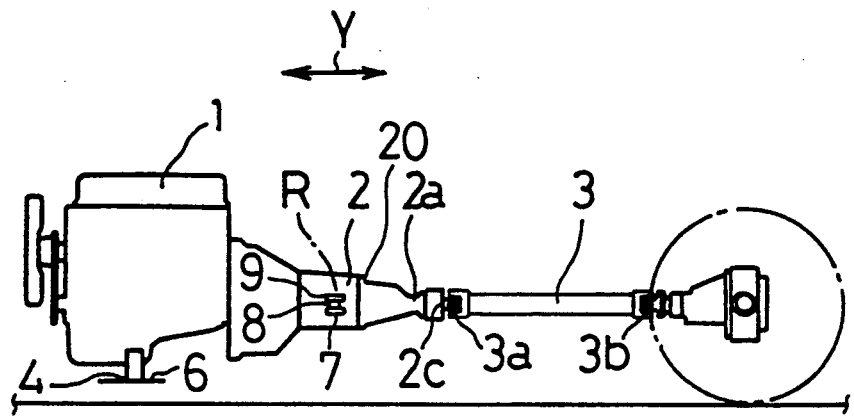
FIG. 1 is a schematic side view of an automobile power plant apparatus according to the present invention.

Having generally described the present invention, a further understanding can be obtained by reference to the specific preferred embodiments which are provided herein for purposes of illustration only and are not intended to limit the scope of the appended claims.

In the following descriptions on the preferred embodiments of an automobile power plant apparatus according to the present invention, a vehicle lengthwise direction is specified with an arrow "Y" in the drawings, and a vehicle widthwise direction is specified with an arrow "X" in the drawings.

FIRST PREFERRED EMBODIMENT

Figure 2:
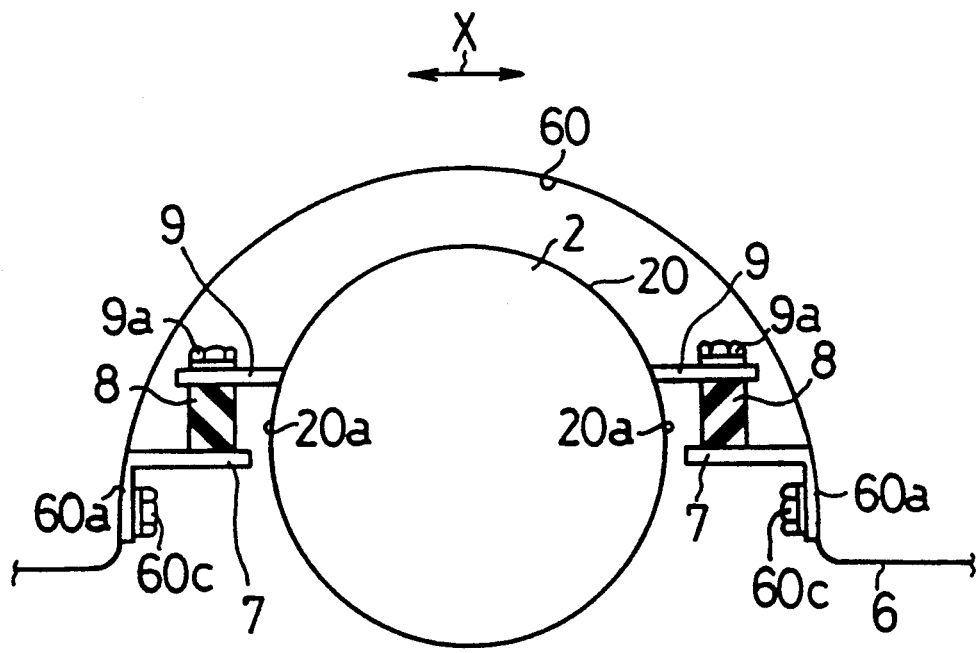
FIG. 2 is a schematic front view of a First Preferred Embodiment of an automobile power plant apparatus according to the present invention and illustrates a construction thereof for supporting sides of a transmission with a pair of rear mounts.

The First Preferred Embodiment of an automobile power plant apparatus according to the present invention will be hereinafter described with reference to FIGS. 1 and 2. FIG. 1 is a schematic side view of the automobile power plant apparatus, and FIG. 2 is a schematic front view of a major portion of the automobile power plant apparatus. As illustrated in FIG. 1, this automobile power plant apparatus has a construction which is basically similar to that of the conventional automobile power plant apparatus. Namely, the present automobile power plant apparatus comprises an engine 1, a transmission 2 connected to an output side of the engine 1 in series in the vehicle lengthwise direction "Y," a propeller shaft 3 connected to an output shaft 2c of the transmission 2 at an end thereof in the vehicle lengthwise direction "Y," a front mount 4 elastically supporting the engine 1, and a body 6.

The body 6 is adapted to be a base of an automobile. On the body 6, there are provided the engine 1, the transmission 2, the propeller shaft 3 and the front mount 4. As illustrated in FIG. 2, the body 6 has a swollen portion 60 which is swollen upward so as to accommodate the propeller shaft 3 and so on therein. Further, on the body 6, there are fixed bracket-like mount installation portions 7 which have a letter "L" shape in their lateral cross sections. These mount installation portions 7 are fixed on installation positions 60a of the swollen portion 60 of the body 6. The mount installation portions 7 are provided in a quantity of 2 in total so as to face sides 20a of a case 20 of the transmission 2 in the vehicle widthwise direction "X." Further, these mount installation portions 7 are disposed so as to oppose the virtual center of the transmission 2 in the vehicle lengthwise direction "Y," i.e., a position "R" illustrated with the alternate long and dash line in FIG. 1.

The rear mounts 8 comprise a rubber material as their base material, and they are installed to the mount installation portions 7 integrally or with a fixture or the like.

The transmission 2 includes the case 20 and a transmission mechanism which is housed in the case 20. On parts of the case 20 of the transmission 2, namely on positions of the case 20 which are substantially adjacent to the virtual center of the transmission 2 in the vehicle lengthwise direction "Y," there are provided flange-like mount engagement portions 9. These mount engagement portions 9 are formed on the sides 20a of the case 20 integrally with the case 20 of the transmission 2.

Further, in this First Preferred Embodiment, the rear mounts 8 are engaged with the mount engagement portions 9 of the transmission 2 by using bolts 9a. Hence, parts of the case 20 of the transmission 2, i.e., the sides 20a of the case 20 which are substantially adjacent to the virtual center of the transmission 2 in the vehicle lengthwise direction "Y," are supported elastically by the body 6 by way of the rear mounts 8.

Figure 7:
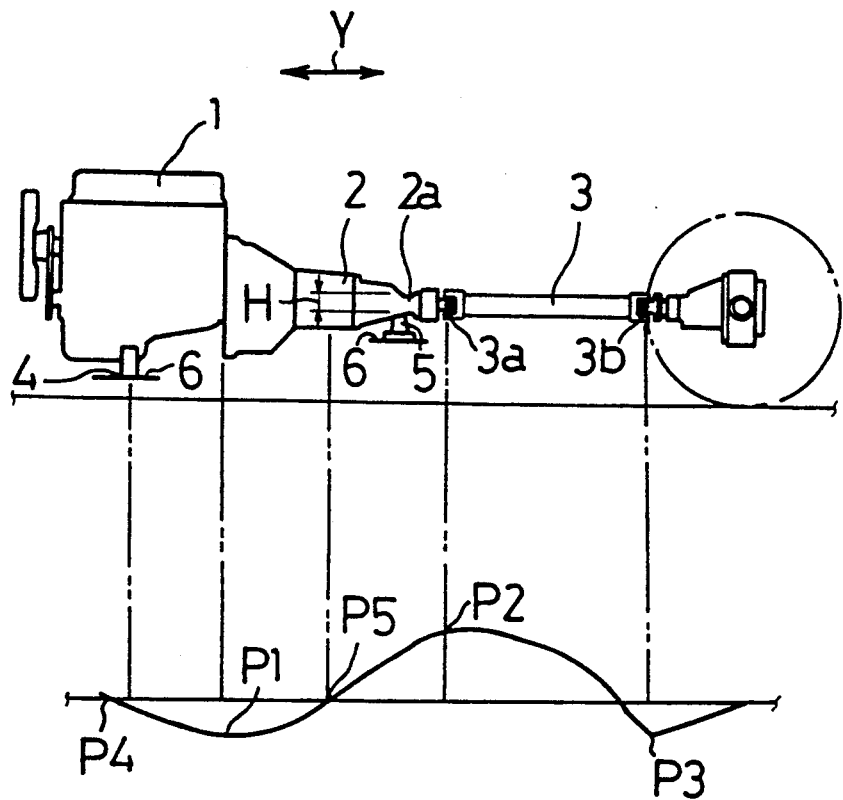
FIG. 7 is a schematic side view of a conventional automobile power plant apparatus and includes the basic characteristic of the resonant mode accompanied by the flexural vibrations at the portions of the conventional automobile power plant apparatus.

As having been described so far, in the First Preferred Embodiment, parts of the case 20 of the transmission 2, i.e., the sides 20a of the case 20 which are substantially adjacent to the virtual center of the transmission 2 in the vehicle lengthwise direction "Y," are supported elastically by the body 6 by way of the rear mounts 8. Therefore, the rear mounts 8 are positioned near the vibrational node "P5" illustrated in the lower half of FIG. 7. As a result, even in the case that there arises the resonance of the flexural vibrations when the engine 1 is running at a high speed, the amplitudes in the vertical direction are small at the rear mounts 8. Accordingly, the vibrations are inhibited from transmitting to the body 6 by way of the rear mounts 8. Hence, it is possible to solve the problem of disturbing noises which to the ears of all oppressive passengers.

In addition, since not the lower part of the transmission 2 but the sides 20a thereof in the vehicle widthwise direction "X" are elastically supported by the rear mounts 8 in this First Preferred Embodiment, it is possible to suppress the raising of the floor position of the body 6 by that means, and it is also possible to provide an appropriate volume for a vehicle room inner space while securing a minimum road clearance for a floor.

SECOND PREFERRED EMBODIMENT

Figure 3:
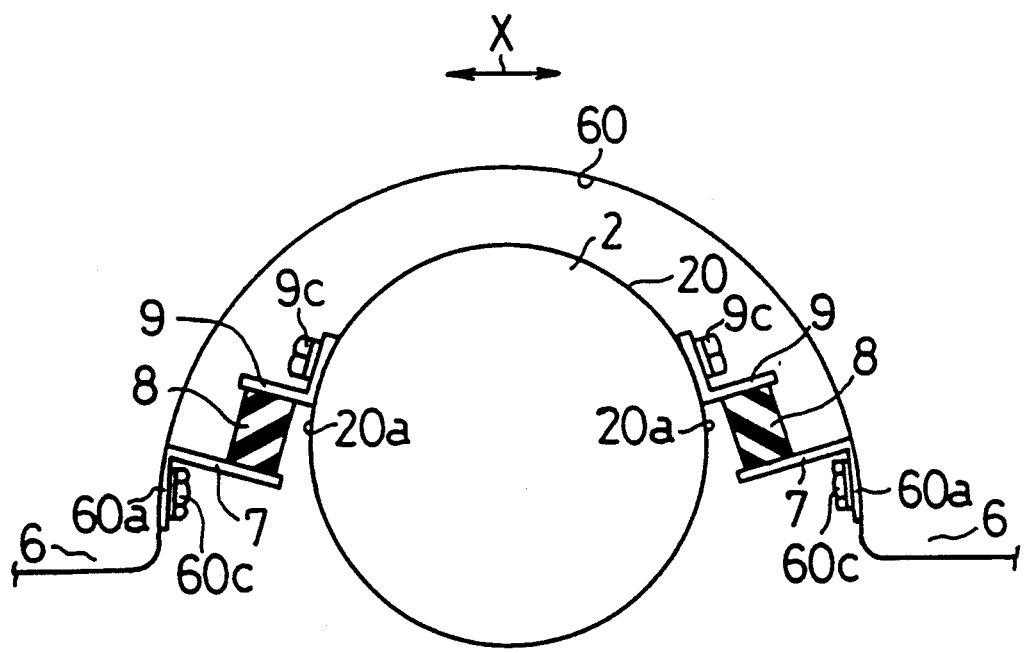
FIG. 3 is a schematic front view of a Second Preferred Embodiment of an automobile power plant apparatus according to the present invention and illustrates a construction thereof for supporting sides of a transmission with a pair of rear mounts.

An automobile power plant apparatus according to the present invention can be constructed as illustrated in FIG. 3. In FIG. 3, component parts which carry out operations basically identical with those of the First Preferred Embodiment are identified with the same reference numerals of FIGS. 1 and 2.

In this Second Preferred Embodiment, mount engagement portions 9 are an independent component part which can be separated from a case 20 of a transmission 2, and they have a letter "L" shape in their lateral cross sections. These mount engagement portions 9 are fixed to sides 20a of the case 20 in the vehicle widthwise direction "X" by using bolts 9c. Moreover, the rear mounts 8 are disposed diagonally in a slightly oblique manner.

THIRD PREFERRED EMBODIMENT

Figure 4:
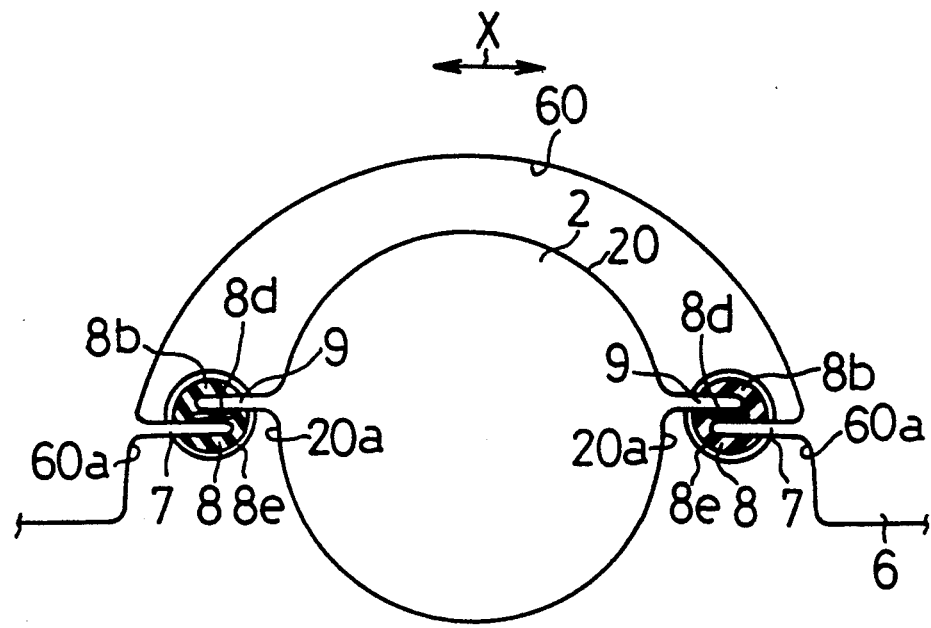
FIG. 4 is a schematic front view of a Third Preferred Embodiment of an automobile power plant apparatus according to the present invention and illustrates a construction thereof for supporting sides of a transmission with a pair of rear mounts.
Figure 5:
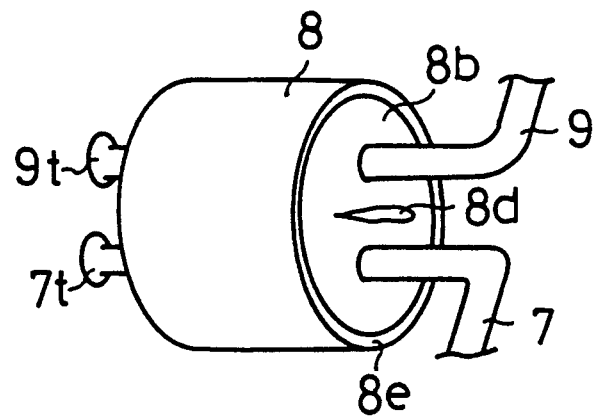
FIG. 5 is a perspective view of the rear mount of the Third Preferred Embodiment of an automobile power plant apparatus according to the present invention.

An automobile power plant apparatus according to the present invention can be constructed as illustrated in FIGS. 4 and 5. In FIGS. 4 and 5, component parts which carry out operations basically identical with those of the First Preferred Embodiment are identified with the same reference numerals of FIGS. 1 and 2.

In this Third Preferred Embodiment, mount engagement portions 9 are formed integrally with a case 20 of a transmission 2, and they are a rod-like protrusion in a letter "L" shape, as illustrated in FIG. 5. Likewise, mount installation portions 7 are formed integrally with a body 6, and they are a rod-like protrusion in a letter "L" shape, as illustrated in FIG. 5. Rear mounts 8 include a rubber material member 8b and an outer cylinder member 8e. The rubber material member 8b includes a cut-off portion 8d which is adapted for adjusting a spring constant of the rear mount 8. An axial line of the rear mounts 8 is placed substantially parallelly with the vehicle lengthwise direction "Y," and front ends 7t of the mount installation portions 7 and front ends 9t of the mount engagement portions 9 are penetrated through the rubber material members 8b of the rear mounts 8.

FOURTH PREFERRED EMBODIMENT

Figure 6:
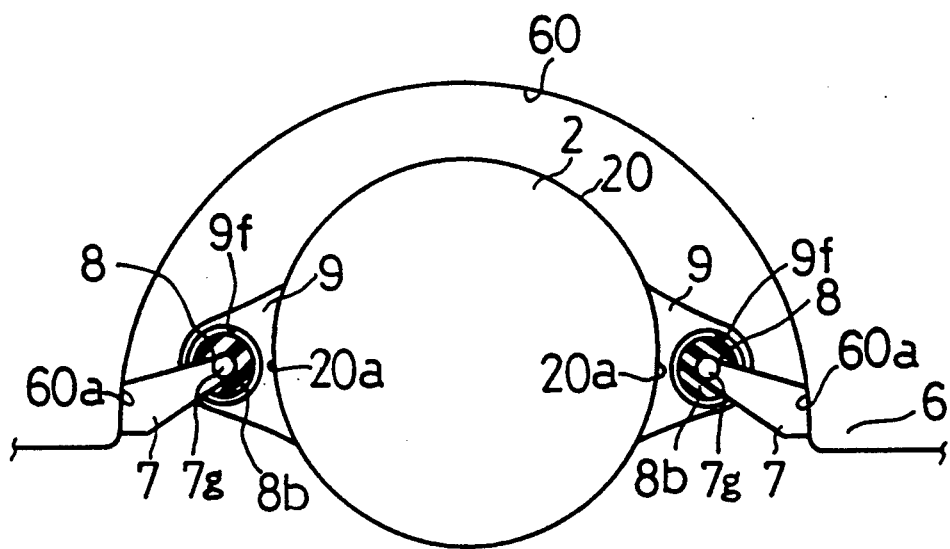
FIG. 6 is a schematic front view of a Fourth Preferred Embodiment of an automobile power plant apparatus according to the present invention and illustrates a construction thereof for supporting sides of a transmission with a pair of rear mounts.

An automobile power plant apparatus according to the present invention can be constructed as illustrated in FIG. 6. In FIG. 6, component parts which carry out operations basically identical with those of the First and Third Preferred Embodiments are identified with the same reference numerals of FIGS. 1, 2, 4 and 5.

In this Fourth Preferred Embodiment, mount engagement portions 9 are formed integrally with a case 20 of a transmission 2, and they have a cylindrical shape which has a hole 9f adapted for press-fitting a rear mount 8 therein. Moreover, mount installation portions 7 have a bracket-like shape, and they are fixed to a body 6. The rear mounts 8 are press-fixed into the holes 9f of the mount engagement portions 9 so that an axial line of the rear mounts 8 is placed substantially parallelly with the vehicle lengthwise direction "Y." In addition, the mount installation portions 7 include a rod-like portions 7g which extend in the vehicle lengthwise direction "Y" at their front end, and the rod-like portions 7g are penetrated through rubber material members 8b of the rear mounts 8.

Also in the Second, Third and Fourth Preferred Embodiments illustrated in FIG. 3, FIGS. 4 and 5, and FIG. 6 respectively, the mount installation portions 7, the mount engagement portions 9 and the rear mounts 8 are disposed substantially adjacent to the virtual center of the transmission 2 in the vehicle lengthwise direction "Y," as they are disposed in the First Preferred Embodiment illustrated in FIGS. 1 and 2. Therefore, also in the Second, Third and Fourth Preferred Embodiments, the rear mounts 8 are placed at the position "R" illustrated with the alternate long and dash line in FIG. 1 which corresponds to the vibrational node "P5" illustrated in the lower half of FIG. 7. Therefore, the Second, Third and Fourth Preferred Embodiments operate and give advantageous effects similarly to the First Preferred Embodiment.

In the First through Fourth Preferred Embodiments described above, the rear mounts 8 support the transmission 2 near its virtual center in the vehicle lengthwise direction "Y" in the above described manners, and accordingly the distance between the front mount 4 and the rear mounts 8 comes to be shortened. As a result, the pitching resonant frequencies of the automobile power plant apparatuses may decrease, and consequently the vibrational transmission might become larger during idling or the like. If there arises such phenomenon, instead of the solid rear mounts 8 which comprise rubber as their base material, a hydraulic mount in which silicone oil or the like is filled can be used, and the damping peaks of the hydraulic mount damping characteristic can be adjusted to the pitching resonant frequencies.

Having now fully described the present invention, it will be apparent to one of ordinary skill in the art that many changes and modifications can be made thereto without departing from the spirit or scope of the present invention as set forth herein including the appended claims.

What is claimed is:
1. An automobile power plant apparatus, comprising:
    an engine;
    a transmission connected to an output side of said engine in series in a vehicle lengthwise direction;
    a propeller shaft connected to an output shaft of said transmission at an end thereof in said vehicle lengthwise direction;
    a body;
    a front mount elastically supporting said engine on said body;
    a rear mount elastically supporting said transmission on said body;
    said transmission including a mount engagement portion positioned substantially adjacent to a virtual center of said transmission in said vehicle lengthwise direction and which is positioned on a side of said transmission in a vehicle widthwise direction, said mount engagement portion including a cylindrical shape which has a hole adapted for press-fitting said rear mount therein;

said body including a mount installation portion positioned substantially adjacent to said virtual center of said transmission in said vehicle lengthwise direction and which is positioned opposite to said side of said transmission in said vehicle widthwise direction, said mount installation portion formed in a bracket shape which includes a rod portion extending in said vehicle lengthwise direction;

said rear mount being held between said mount engagement portion and said mount installation portion, said rear mount being press-fitted into said hole of said mount engagement portion and which is penetrated through the rod portion of said mount installation portion so that axial line thereof is placed substantially parallel with said vehicle lengthwise direction; and said transmission being elastically supported by said body at a position thereof adjacent to said virtual center thereof in said side thereof in said vehicle lengthwise direction.

2. The automobile power plant apparatus according to claim 1, wherein said mount engagement portion is positioned at a position, which corresponds to a vibrational node in said automobile power plant apparatus in said vehicle lengthwise direction, and said mount installation portion is positioned at a position, which is substantially opposite to said position in said side of said transmission in said vehicle widthwise direction, in said body.

3. The automobile power plant apparatus according to claim 1, wherein said rear mount is held horizontally between said mount engagement portion of said transmission and said mount installation portion of said body.

4. The automobile power plant apparatus according to claim 1, wherein said mount engagement portion of said transmission is formed integrally with said transmission.

5. The automobile power plant apparatus according to claim 1, wherein said mount installation portion of said body is disposed detachably on said body.

6. The automobile power plant apparatus according to claim 1, wherein said mount engagement portion of said transmission is formed integrally with said transmission, said mount installation portion of said body is formed integrally with said body.

7. The automobile power plant apparatus according to claim 1, wherein said transmission includes a pair of said mount engagement portions which are positioned substantially adjacent to said virtual center of said transmission in said vehicle lengthwise direction and which are positioned on each side of said transmission in said vehicle widthwise direction, said body includes a pair of said mount installation portions which are positioned substantially adjacent to said virtual center of said transmission in said vehicle lengthwise direction and which are positioned opposite to said sides of said transmission in said vehicle widthwise direction, said body further includes a pair of said rear mounts which are installed to said mount installation portions, and said rear mounts of said body engage with said mount engagement portions of said transmission.

8. The automobile power plant apparatus according to claim 1, wherein said mount installation portion is fixed at an installation position of a portion of said body.

* * * * *